(12) United States Patent
Fujita

(10) Patent No.: US 6,845,074 B1
(45) Date of Patent: Jan. 18, 2005

(54) INFORMATION READOUT APPARATUS AND INFORMATION READOUT METHOD

(75) Inventor: Goro Fujita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/636,053

(22) Filed: Aug. 10, 2000

(30) Foreign Application Priority Data

Aug. 19, 1999  (JP) .......................................... P11-233241

(51) Int. Cl.$^7$ .............................................. G11B 7/00
(52) U.S. Cl. ................................ 369/59.17; 369/124.15
(58) Field of Search ........................... 369/53.11, 59.11, 369/59.17, 124.11, 124.15, 116, 47.5, 47.51

(56) References Cited

U.S. PATENT DOCUMENTS

| | | | |
|---|---|---|---|
| 5,483,513 A | 1/1996 | Fuji | |
| 5,602,810 A | 2/1997 | Horimai et al. | 369/44.34 |
| 5,606,545 A | 2/1997 | Horimai et al. | 369/124 |
| 5,617,400 A * | 4/1997 | Fuji | 369/116 |
| 5,633,854 A | 5/1997 | Horimai et al. | 369/124 |
| 5,684,783 A | 11/1997 | Horimai et al. | 369/124 |
| 6,278,667 B1 * | 1/1998 | Belser | 369/116 |

FOREIGN PATENT DOCUMENTS

| | | |
|---|---|---|
| EP | 0 524 315 | 1/1993 |
| EP | 0 800 169 | 10/1997 |
| WO | WO 99/53489 | 10/1999 |

OTHER PUBLICATIONS

Patent Abstracts of Japan. vol. 1999, No. 13, Nov. 30, 1999, JP 11 224424, Aug. 17, 1999.

* cited by examiner

*Primary Examiner*—Nabil Hindi
(74) *Attorney, Agent, or Firm*—Oblon, Spivak, McClelland, Maier & Neustadt, P.C.

(57) ABSTRACT

An information readout apparatus and an information readout method can efficiently correct the change in the size of the aperture. An optical disk 1 having a recording layer and a readout layer is used and the information recorded on the recording layer of the optical disk 1 is read out by irradiating a light beam onto the optical disk form head 2 and opening a detection window smaller than the area irradiated by the light beam in the readout layer. The resolution detecting section 15 of the apparatus detects the isolated mark recorded in the optical disk 1 in advance and then detects the resolution on the basis of the quotient obtained by dividing the difference X between the sample value Y near the peak of said isolated mark and the sample value adjacent to said sample value Y by said sample value Y near the peak, or X/Y. The readout control circuit 14 of the apparatus controls the size of the detection window so as to make the resolution detected by the resolution detecting section 15 close to the reference value K from the reference value output section 13 of the apparatus.

12 Claims, 12 Drawing Sheets

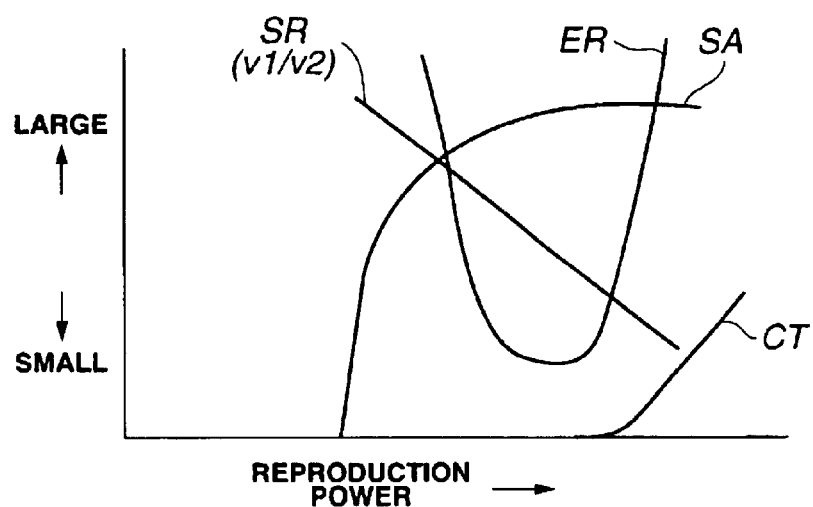
FIG.5
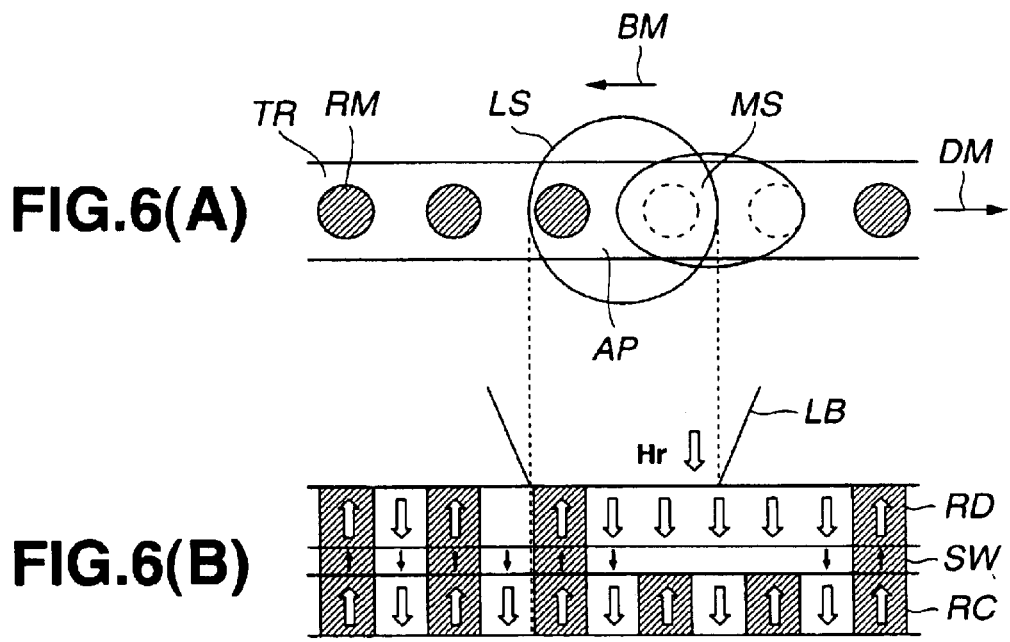
FIG.6(A)
FIG.6(B)

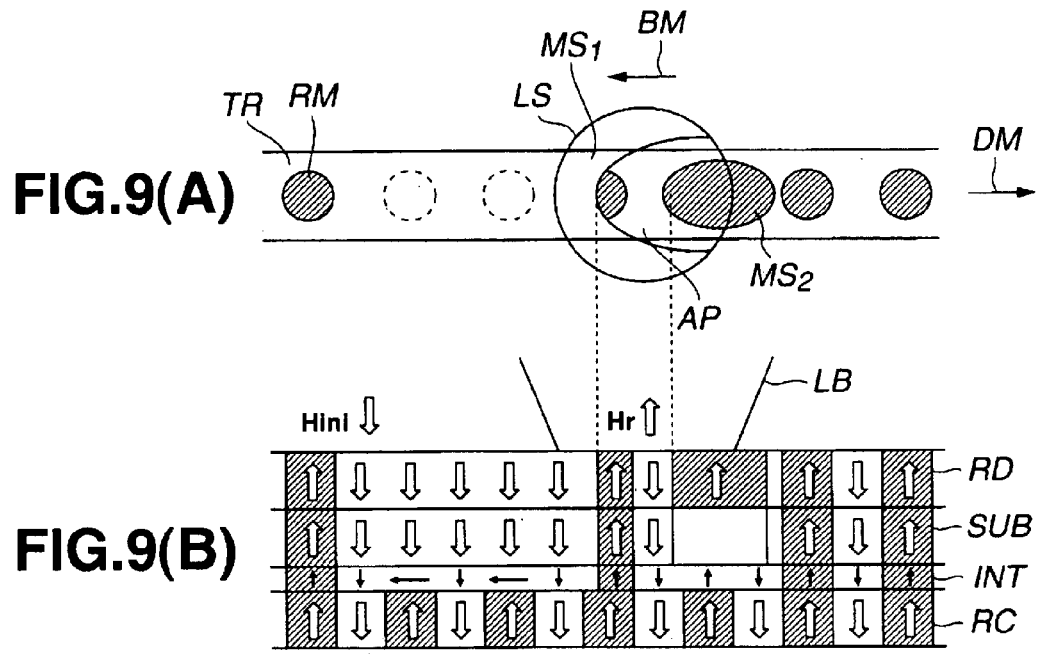
FIG.9(A)
FIG.9(B)
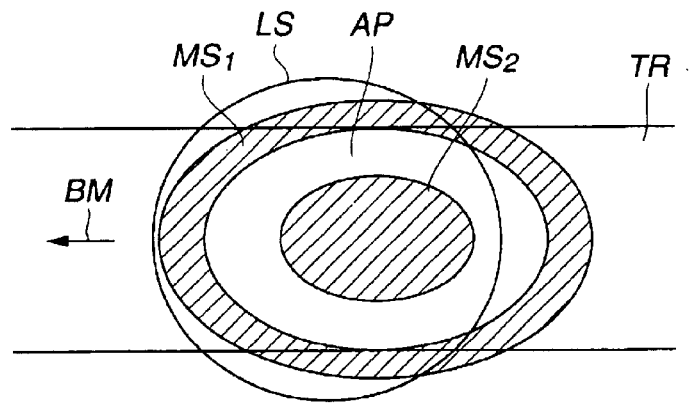
FIG.10

FIG.11(A) (P1) 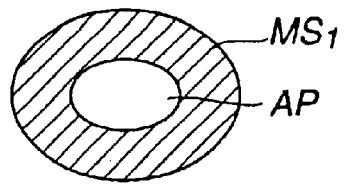
FIG.11(B) (P2) 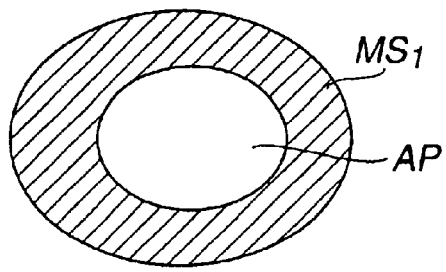
FIG.11(C) (P3) 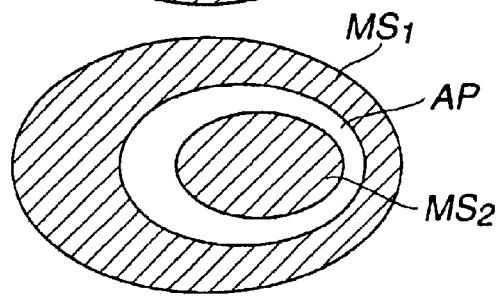
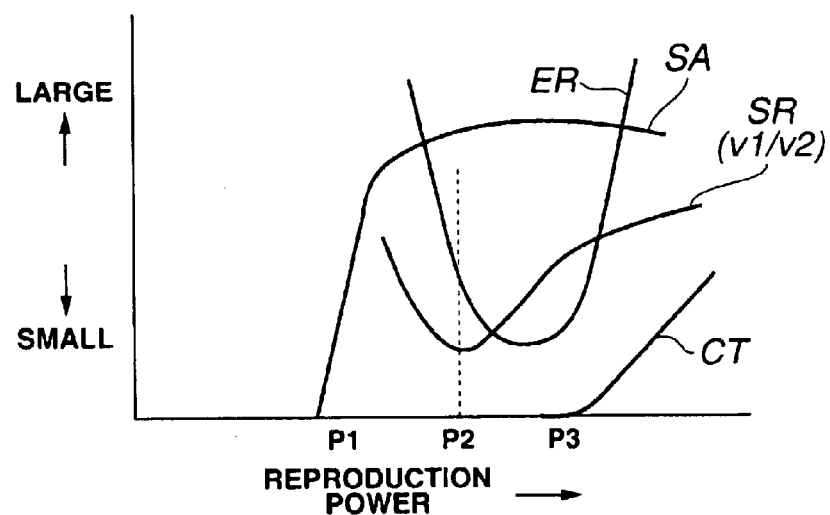
FIG.12

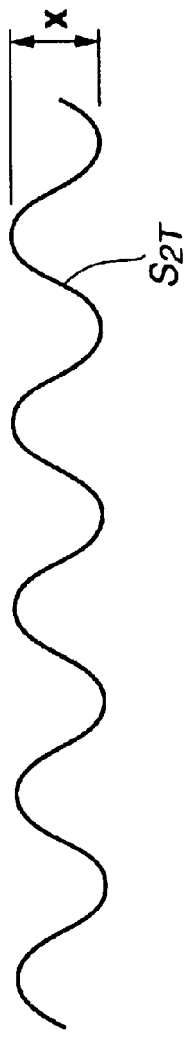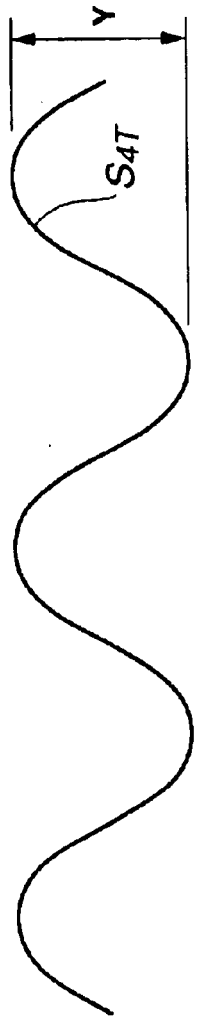
FIG.15(A)
FIG.15(B)

FIG.16(A) RECORDED DATA 
FIG.16(B) ISOLATION MARK 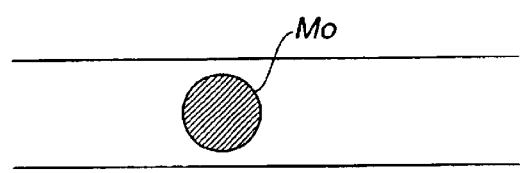
FIG.16(C) REPRODUCED WAVEFORM 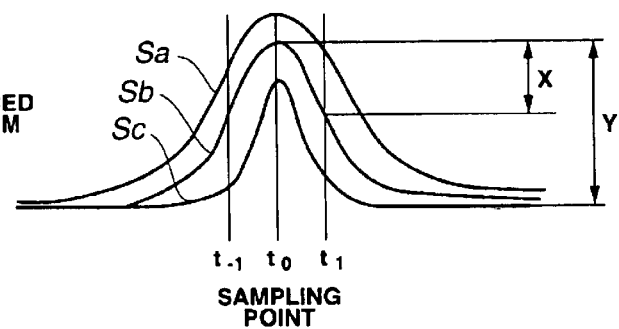
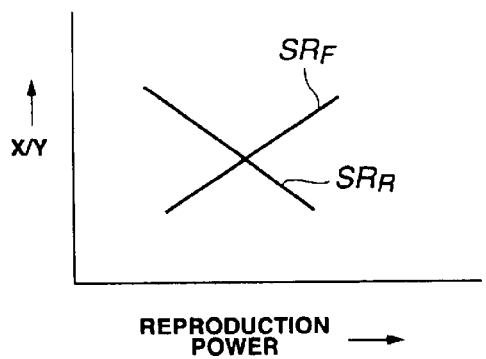
FIG.17

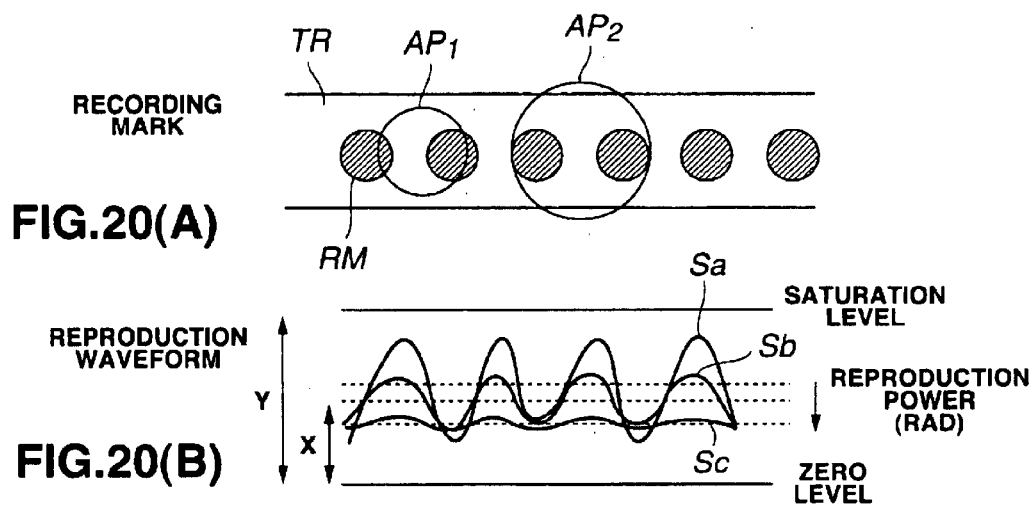
FIG.20(A)
FIG.20(B)
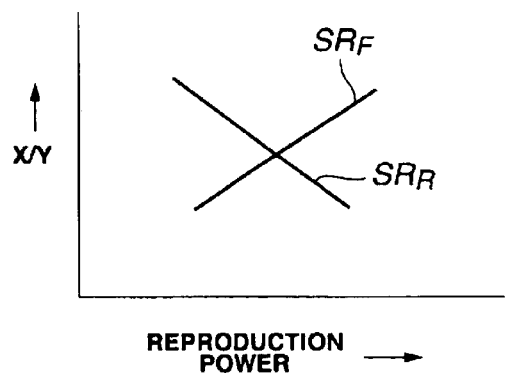
FIG.21

INFORMATION READOUT APPARATUS AND INFORMATION READOUT METHOD

BACKGROUND OF THE INVENTION

1. Field of the Invention

This invention relates to an information readout apparatus and an information readout method for reading out information from a recording medium such as an optical disk in a controlled manner. More particularly, the present invention relates to an information readout apparatus and an information readout method adapted to optimally control the detection window of a super resolution optical disk that is operating as readout area within the light beam irradiation range of the disk.

2. Prior Art

At present, optical disks are popularly used as medium for storing image information, sound information and computer data because of the advantage of having a large storage capacity.

In recent years, various technologies have been developed for raising the signal recording density of recording media such as opto-magnetic disks and phase change disks. Particularly, technologies of super resolution readout for reading out a recorded mark smaller than the diameter of a light spot formed by a light beam have been drawing attention.

Known super resolution disks include MSR (magnetic super resolution) disks, PSR (phase change super resolution) disks and RSR (ROM super resolution) disks. On the other hand, known readout systems include the RAD (rear aperture detection) system, the FAD (front aperture detection) system and the double mask system which are discriminated from each other in terms of the position of the readout area to be detected by means of a light spot formed by a beam spot. The CAD (central aperture detection) system is also known as a variation of the RAD system.

As disclosed in a number of patent documents of the applicant of the present patent application including Japanese Patent Applications Laid-Open Nos. 3-93056 and 3-93058, an MSR disk of the RAD system represents the technology of forming a recording layer by using a multilayer film comprising a readout layer and a recording/holding layer that are magnetically coupled with each other and heating the readout layer to a predetermined temperature range by irradiating it with a laser beam for the purpose of readout so that only the magnetized signals stored in the heated area of the recording/holding layer can be transferred to the readout layer and actually read out. In other words, a recorded mark smaller than the diameter of the light spot formed by the laser beam can be transferred and read out by means of this technology. The area from which the magnetized signals are transferred to the readout layer and can be read out is referred to as detection window or aperture.

On the other hand, an MSR disk of the CAD system is so adapted that an opto-magnetic recording medium comprising a recording layer and an intra-planarly magnetizable readout layer is irradiated with a light beam from the side of the readout layer to raise the temperature of the readout layer above a predetermined level only in the area irradiated with the light beam. Then, the state of magnetization of the readout layer is shifted from that of intra-planarly magnetization of only the detection window (aperture) in the area that is irradiated with the light beam to raise the temperature thereof above the predetermined level to that of vertical magnetization of transferring the magnetism of the detection window to the corresponding area of the recording layer. As a result, a recorded mark smaller than the diameter of the light spot formed by the light beam can be read out.

Thus, with the MSR technology, a super resolution readout effect is realized as the data written on the recording layer is magneto-optically read out while shifting the state of magnetization of the readout layer.

As for data readout using the MSR (magnetic super resolution) technology, it is known that the readout condition for optimizing the signal quality varies as a function of the sensitivity of the medium, the ambient temperature and perturbation such as skew of the medium substrate.

Meanwhile, with the RAD system, the size of the aperture varies as a function of the readout power of the light beam. Therefore, as the readout power is raised, the size of the aperture increases to consequently increases the area to be used for reading out the recorded mark on the recording layer arranged under the readout layer. With this system, then, while the C/N ratio (the carrier to noise ratio) rises, the super resolution effect is reduced so that any of the recorded marks of the adjacent tracks may be read out and hence unrelated signals may become detected to raise the cross talk level. On the other hand, the C/N ratio lowers as the readout power is reduced.

As pointed out above, the inter-code interference factor and the cross talk factor increases when the readout power is too strong, whereas the C/R ratio falls when the readout power is too weak. In any case, the jitter that appears as positional error of changeover from 1 to 0 or vice versa becomes remarkable when reading out the signal.

In view of this problem, Japanese Patent Application Laid-Open No. 8-63817 proposes a technique of optimizing the effect of signal readout by detecting the amplitude of each of the read out signals representing so many patterns of recorded marks having different lengths, comparing the signal levels and controlling the readout power to bring them close to a reference value. With this technique, for instance, the size of the detection window can be controlled by reducing the readout power when the ambient temperature is high.

However, with this known technique, the signals representing the respective patterns of recorded marks for detecting the resolution are arranged on the data area of the optical disk to consequently give rise to a problem of an enhanced level of redundancy, which by turn reduces the available recording capacity of the optical disk. Additionally, if a specific area (lead-in area) is provided on the optical disk to store the signals representing the respective patterns of recorded marks, a track jumping action is needed to get to that specific area in order to control the readout power during a signal readout operation at the cost of the access efficiency of the optical disk. If, on the other hand, the signals representing the recorded patterns are distributed over the entire surface of the optical disk to avoid this problem, they are more affected by the surface defects, if any, of the optical disk.

Still additionally, there is a problem that the amplitudes of the signals cannot be sampled at the peak level depending on the modulation system if the readout clock for demodulating data is used for the sampling. Then, it may be totally impossible to detect the amplitudes of the signals.

In view of the above identified problems, it is therefore the object of the present invention to provide an information readout apparatus and an information readout method adapted to efficiently correct any change in the aperture size without sacrificing the recording capacity and without using a clock dedicated to detect the amplitude of the read out signals having respective specific mark lengths.

SUMMARY OF THE INVENTION

According to the invention, the above object is achieved by providing an information readout apparatus for irradiating a recording medium having a recording layer and a readout layer with a light beam and reading the recorded information on the recording layer by opening a detecting window smaller than the area irradiated with the optical beam, said apparatus comprising:

a resolution detecting means for detecting the resolution on the basis of the sampled values of the read out waveform of the isolated mark recorded/formed on said recording medium;

a reference value output means for outputting a reference value for said resolution; and a readout control means for controlling the size of said detection window so as to make said detected resolution close to said reference value.

In another aspect of the invention, there is also provided an information readout method for irradiating a recording medium having a recording layer and a readout layer with a light beam and reading the recorded information on the recording layer by opening a detecting window smaller than the area irradiated with the optical beam, said method comprising steps of:

detecting the resolution on the basis of the sampled values of the read out waveform of the isolated mark recorded/formed on said recording medium;

outputting a reference value for said resolution; and controlling the size of said detection window so as to make said detected resolution close to said reference value.

For the purpose of the invention, the resolution may be detected on the basis of the quotient obtained by dividing the difference X between the sample value Y near the peak of said isolated mark and the sample value adjacent to said sample value Y by said sample value Y near the peak, or X/Y.

In still another aspect of the invention, there is also provided an information readout apparatus for irradiating a recording medium having a recording layer and a readout layer with a light beam and reading the recorded information on the recording layer by opening a detecting window smaller than the area irradiated with the optical beam, said apparatus comprising:

a resolution detecting means for detecting the resolution on the basis of the average level and the saturation level of the signals read out from said recording medium;

a resolution detecting means for detecting the resolution on the basis of the signal level of the read out waveform of the isolated mark recorded/formed on said recording medium; and a reference value output means for outputting a reference value for said resolution; and a readout control means for controlling the size of said detection window so as to make said detected resolution close to said reference value.

In still another aspect of the invention, there is also provided an information readout method for irradiating a recording medium having a recording layer and a readout layer with a light beam and reading the recorded information on the recording layer by opening a detecting window smaller than the area irradiated with the optical beam, said method comprising steps of:

detecting the resolution on the basis of the average level and the saturation level of the signals read out from said recording medium;

detecting the resolution on the basis of the signal level of the read out waveform of the isolated mark recorded/formed on said recording medium; and outputting a reference value for said resolution; and controlling the size of said detection window so as to make said detected resolution close to said reference value.

With this arrangement, it is no longer necessary to reduce the recording capacity of the recording medium nor use a clock dedicated to detect the amplitude of the read out signals having a specific mark length.

Thus, according to the invention, in a process of irradiating a recording medium having a recording layer and a readout layer with a light beam and reading the recorded information on the recording layer by opening a detecting window smaller than the area irradiated with the optical beam, the resolution is detected on the basis of the sampled values of the read out waveform of the isolated mark recorded/formed on the recording medium, a reference value is output for the resolution and the size of the detection window is controlled so as to make the detected resolution close to the reference value. Therefore, unlike the prior art, it is no longer necessary to provide a plurality of recording nark patterns having respective lengths that are different from each other so that the level of redundancy and the reduction of the recording capacity of the disk can be minimized. Nor is it necessary to use a clock dedicated to detect the amplitude of the read out signal having a specific mark length.

Also, according to the invention, in a process of irradiating a recording medium having a recording layer and a readout layer with a light beam and reading the recorded information on the recording layer by opening a detecting window smaller than the area irradiated with the optical beam, the resolution is detected on the basis of the average level and the saturation level of the signals read out from said recording medium and also on the basis of the signal level of the read out waveform of the isolated mark recorded/formed on said recording medium, a reference value is output for the resolution and the size of the detection window is controlled so as to make the detected resolution close to the reference value. Therefore, unlike the prior art, it is no longer necessary to record in advance signals having specific respective mark lengths on the optical disk so that the level of redundancy and the reduction of the recording capacity of the disk can be minimized because the resolution can be detected on the basis of the average level and the saturation levels of the signals of the ordinary signals read out from the recording medium. Nor is it necessary to use a clock dedicated to detect the amplitude of the read out signal having a specific mark length and accurately obtain resolution-related information on a stable basis.

BRIEF DESCRIPTION OF THE DRAWINGS

FIG. 5 is a graph illustrating the signal resolution, the error rate, the signal amplitude and the cross talk relative to the readout power of a super resolution disk of the RAD system.

FIG. 6A is a schematic plan view of an MSR disk of the FAD system, illustrating the underlying theory.

FIG. 6B is a schematic cross sectional view of the MSR disk of FIG. 6A.

FIG. 9A is a schematic plan view of an MSR disk of the double mask system, illustrating the underlying theory.

FIG. 9B is a schematic cross sectional view of the MSR disk of FIG. 9A.

FIG. 10 is a schematic plan view of light spot LS formed by irradiating a light beam on track TR of a super resolution disk of the double mask system and its vicinity.

FIGS. 11(A), 11(B) and 11(C) are schematic illustrations of the change in the mask and the aperture relative to the change in the readout power of an MSR disk of the double mask system.

FIG. 12 is a graph illustrating the signal resolution, the error rate, signal amplitude and the cross talk relative to the readout power of a super resolution disk of the double mask system.

FIG. 15A is a schematic illustration of a read out signal of a 2T mark length pattern.

FIG. 15B is a schematic illustration of a read out signal of a 4T mark length pattern.

FIGS. 16(A), 16(B), and 16(C) are schematic illustrations of the theory underlying the first embodiment of the invention.

FIG. 17 is a graph illustrating the relationship between the readout power and the resolution of the first embodiment.

FIGS. 20(A) and 20(B) are schematic illustrations of the theory underlying the second embodiment of the invention.

FIG. 21 is a graph illustrating the relationship between the readout power and the resolution of the second embodiment.

DESCRIPTION OF THE PREFERRED EMBODIMENTS

Now, the present invention will be described in greater detail by referring to the accompanying drawings that illustrate preferred embodiments of the invention.

Figure 1:
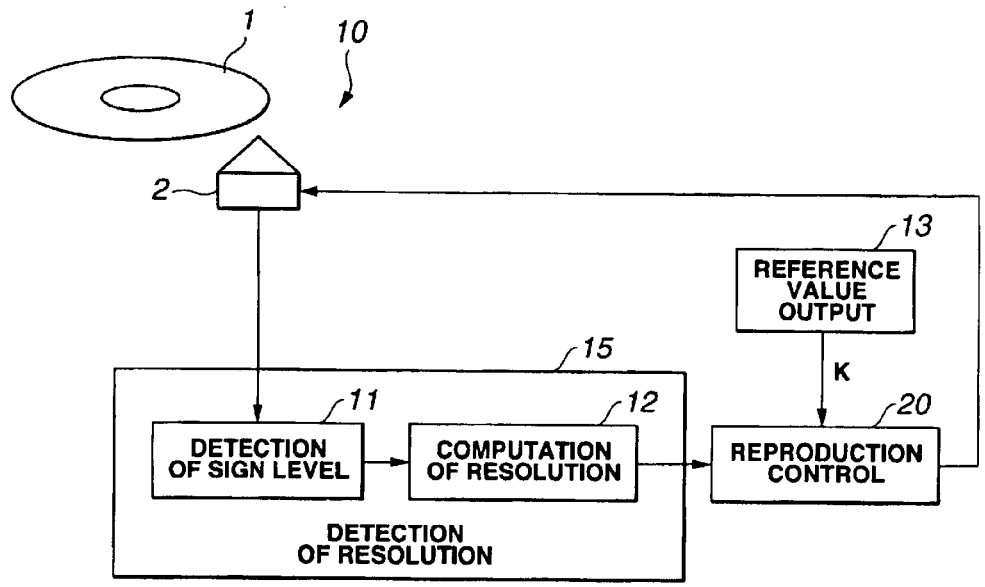
FIG. 1 is a schematic block diagram of an information readout apparatus according to the invention and adapted to read out information from an optical disk, illustrating its configuration.

FIG. 1 is a schematic block diagram of an information readout apparatus according to the invention and adapted to read out information from an optical disk, illustrating its configuration.

Referring to FIG. 1, the information readout apparatus 10 is adapted to irradiate a light beam to an optical disk 1 that is a recording medium having a recording layer and a readout layer by means of head 2 and read the information recorded on the recording layer by opening a detection window (aperture) smaller than the area irradiated by the light beam on the readout layer. The information readout apparatus determines the resolution by means of resolution detecting section 15 on the basis of the level of the signal read out from the optical disk 1 by means of the head 2. More specifically, the resolution detecting section 15 has a signal level detection circuit 11 and a resolution computation circuit 12, of which the signal level detection circuit 11 detects the level of the signal read out from the optical disk 1 and the resolution computation circuit 12 computationally determines the resolution on the basis of the signal level and informs the readout control circuit with the resolution. Reference value output circuit 13 outputs reference value K that provides a target for controlling the resolution and readout control circuit 20 controls the readout power of the light beam from the head 2 so as to make the resolution as detected by the resolution detecting section 15 come closer to the reference value K.

Figure 2:
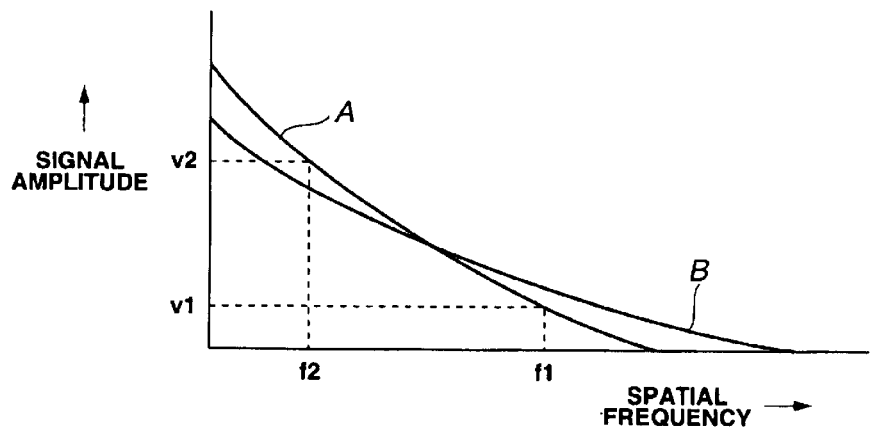
FIG. 2 is a graph illustrating the relationship between the spatial frequency and the signal amplitude.

FIG. 2 is a graph illustrating the relationship between the spatial frequency and the signal amplitude. In FIG. 2, curve A represents the performance of a disk showing an ordinary resolution level and curve B represents the performance of a super resolution disk showing a super resolution level. Referring to FIG. 2, if signal amplitudes v1 and v2 are respectively for two different spatial frequencies f1 and f2 (f1<f2), v1/v2 provides a value that corresponds to the signal resolution, a greater value of v1/v2 indicating a higher resolution. Thus, the resolution can be detected by detecting the ratio of two different spatial frequencies of f1 and f2 or that of two different signal levels v1/v2, which is equal to the ratio of the signal amplitudes, of two signals with different mark lengths.

Now, the relationship of the readout power and the resolution of a super resolution disk will be discussed below. Various different systems that can be used for super resolution disks are known to date and it will be described hereinafter that it is necessary for any system to control the readout power in order to optimize the aperture that is the detection window for signal readout.

Figure 3A:
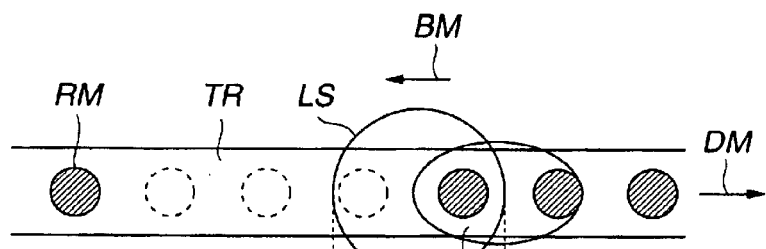
FIG. 3A is a schematic plan view of an MSR disk of the RAD system, illustrating the underlying theory.
Figure 3B:
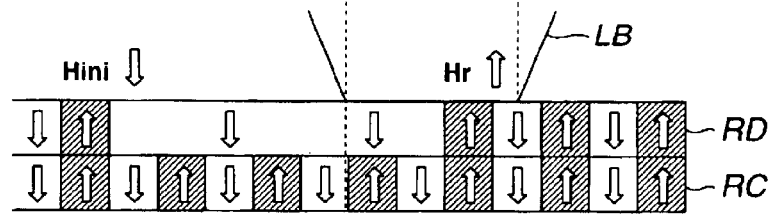
FIG. 3B is a schematic cross sectional view of the MSR disk of FIG. 3A.

FIGS. 3A and 3B schematically illustrate the theory underlying an MSR disk of the RAD system, of which FIG. 3A is a schematic plan view of the MSR disk and FIG. 3B is a schematic cross sectional view of the MSR disk. Referring to FIGS. 3A and 3B, the disk-shaped recording medium comprises an exchange-coupled two-layer film having a recording layer RC and a readout layer RD. When a light beam is irradiated onto the disk-shaped recording medium that is moving in the sense of arrow DM as the disk is driven to turn, the highest temperature area is located at a position slightly displaced to the rear from the center of the light spot light source because of the difference between the rate of relative movement of the light beam in the direction of arrow BM and the rate of thermal diffusion of the recording medium. The highest temperature area is used as the detection window (aperture) AP, or the readout area, and the low temperature area located in front of the light beam is masked. The RAD system requires an externally applied readout magnetic field Hr and an initial magnetic field Hini and the readout layer RD is initialized before the readout operation by applying the initial magnetic field Hini in front of the light spot LS along recording track TR. When the initialized part of the readout layer enters the light spot LS, one or more than one recorded bits (as magnetized upward in FIG. 3B) of that part are transferred to the readout layer RD by means of the externally applied readout magnetic field Hr in the hot detection window (aperture) AP and then read out.

Figure 4:
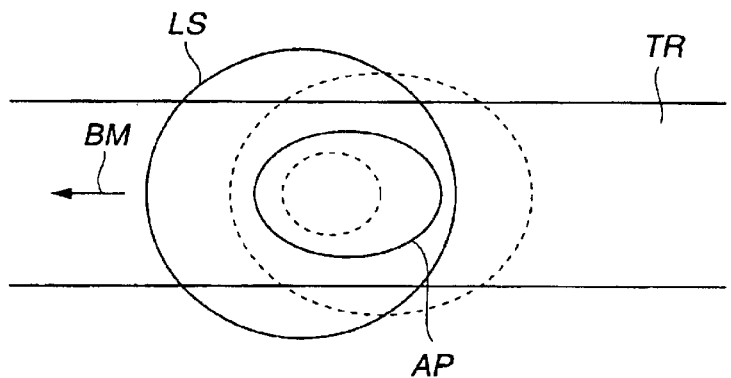
FIG. 4 is a schematic plan view of light spot LS formed by irradiating a light beam on track TR of a super resolution disk of the RAD system and its vicinity.

FIG. 4 is a schematic plan view of light spot LS formed by irradiating a light beam on track TR of a super resolution disk of the RAD system and its vicinity. The aperture (detection window) AP changes its size as a function of the readout power as indicated by the broken lines in FIG. 4. More specifically, the smaller the readout power, the smaller the aperture AP. Differently stated, the greater the readout power, the greater the aperture AP.

FIG. 5 is a graph illustrating the signal resolution SR, the error rate ER, the signal amplitude SA and the cross talk CT relative to the readout power of a super resolution disk of the RAD system.

As seen from FIG. 5, the signal amplitude SA remains large once the readout power exceeds a certain level to provide a satisfactory C/N (carrier/noise) level, while the error rate ER falls as the readout power rises. The signal resolution SR also falls as the readout power rises because, in the case of the RAD system, the aperture increases as the readout power rises. When the readout power rises further, the aperture becomes almost as large as the light spot formed by the light beam to consequently reduce the resolution and make the optical disk no longer show the super resolution performance and both the cross talk CT from adjacent tracks and the error rate ER increase. Therefore, in the case of a super resolution disk of the RAD system, the signal resolution SR is inversely proportional to the readout power. Besides, there exists a readout power level that minimizes the error rate ER. The signal resolution corresponding to this readout power level takes the above described reference value K that provides the target value for controlling the readout power.

FIGS. 6A and 6B schematically illustrate the theory underlying an MSR disk of the FAD system, of which FIG. 6A is a schematic plan view of the MSR disk and FIG. 6B is a schematic cross sectional view of the MSR disk. Referring to FIGS. 6A and 6B, when a light beam is irradiated onto the disk-shaped recording medium that is moving in the sense of arrow DM as the disk is driven to turn, the highest temperature area is located at a position slightly displaced to the rear from the center of the light spot light source because of the difference between the rate of relative movement of the light beam in the direction of arrow BM and the rate of thermal diffusion of the recording medium. The highest temperature area becomes masked area MS and the low temperature area located in front of the light beam becomes the detection window (aperture) AP, or the readout area. Since the masked area MS shows an elliptic contour, the detection window (aperture) AP shows the contour of a crescent.

A super resolution optical disk of the FAD system comprises an exchange-coupled three-layer film having a recording layer RC, a switching layer SW and a readout layer RD. When reading out signals with the FAD system, a readout magnetic field Hr is externally applied and the magnetization of the high temperature area behind the light beam is directed to a single direction to form a masked area MS. Then, one or more than one recorded bits of the cold detection window AP located in a front part of the beam are read out.

Figure 7:
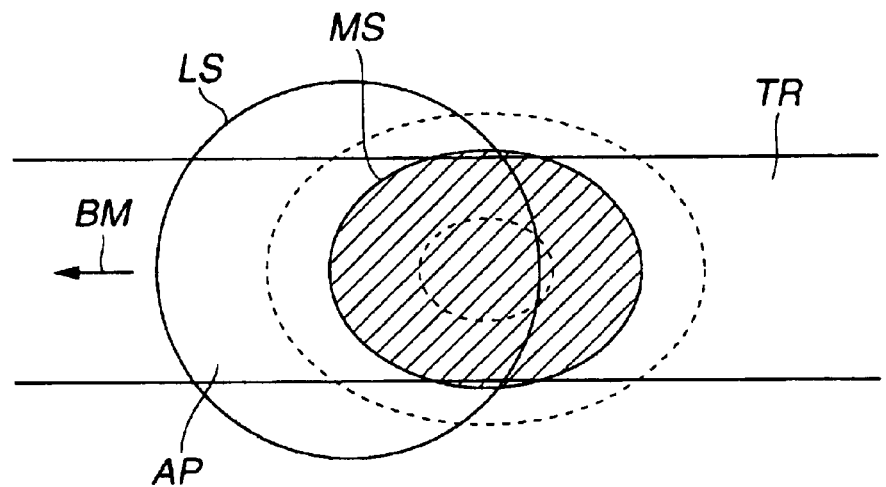
FIG. 7 is a schematic plan view of light spot LS formed by irradiating a light beam on track TR of a super resolution disk of the FAD system and its vicinity.

FIG. 7 is a schematic plan view of light spot LS formed by irradiating a light beam on track TR of a super resolution disk of the FAD system and its vicinity. The aperture (detection window) AP changes its size as a function of the readout power as indicated by the broken lines in FIG. 4. More specifically, the smaller the readout power, the smaller the masked area MS. Differently stated, the greater the readout power, the greater the masked area MS.

Figure 8:
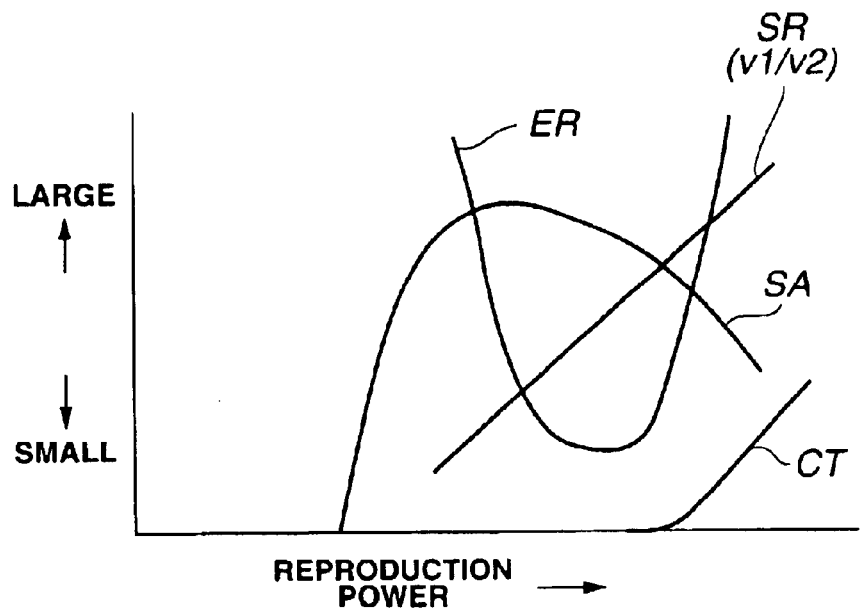
FIG. 8 is a graph illustrating the signal resolution, the error rate, signal amplitude and the cross talk relative to the readout power of a super resolution disk of the FAD system.

FIG. 8 is a graph illustrating the signal resolution SR, the error rate ER, the signal amplitude SA and the cross talk CT relative to the readout power of a super resolution disk of the FAD system.

As seen from FIG. 8, the signal amplitude SA remains large once the readout power exceeds a certain level to provide a satisfactory C/N (carrier/noise) level, while the error rate ER falls as the readout power rises. The signal resolution SR rises as the readout power rises because, in the case of the FAD system, the masked area MS increases to reduce the detection window (aperture) as the readout power rises. When the readout power rises further, the cross talk CT increases and eventually all the area within the light spot becomes the masked area to make it no longer possible to read out signals there. While the error rate ER falls as the readout power rises from a low level, it reaches the lowest point when the readout power gets to a certain level and then starts rising as the readout power rises from that level. The signal resolution corresponding to the readout power level that minimizes the error rate ER takes the above described reference value K that provides the target value for controlling the readout power.

FIGS. 9A and 9B schematically illustrate the theory underlying an MSR disk of the double mask system, of which FIG. 9A is a schematic plan view of the MSR disk and FIG. 9B is a schematic cross sectional view of the MSR disk. The double mask system is realized by combining the RAD system and the FAD system.

Referring to FIGS. 9A and 9B, when a light beam is irradiated onto the disk-shaped recording medium that is moving in the sense of arrow DM as the disk is driven to turn, the highest temperature area is located at a position slightly displaced to the rear from the center of the light spot light source because of the difference between the rate of relative movement of the light beam in the direction of arrow BM and the rate of thermal diffusion of the recording medium. Then, a low temperature area in a front part of the light beam becomes the first masked area MS1 and the second masked area MS2 is formed in the above high temperature area. The area located between the two masked areas MS1 and MS2 becomes the detection window (aperture) AP.

A super resolution optical disk of the double mask system comprises an exchange-coupled four-layer film having a recording layer RC, an intermediate layer INT, a subsidiary layer SUB and a readout layer RD. The double mask system uses an externally applied readout magnetic field Hr and an initial magnetic field Hini, of which the initial magnetic field Hini is applied in front of the light spot LS along recording track TR to initialize the readout layer RD before the readout operation. When the initialized part of the readout layer RD enters the light spot LS, one or more than one recorded bits (as magnetized upward in FIG. 9B) of that part are transferred to the readout layer RD by means of the externally applied readout magnetic field Hr in the detection window (aperture) AP and then read out.

FIG. 10 is a schematic plan view of light spot LS formed by irradiating a light beam on track TR of a super resolution disk of the double mask system and its vicinity, illustrating the relationship among the first and second masked areas MS1 and MS2 and the detection window (aperture) AP and also relative to the light spot LS. The relationship of these areas changes as the readout power changes in a manner as shown in (A) through (C) of FIG. 11. The readout power rises from a low level (P1) of (A) to a level (P2) slightly lower than the level of forming two masks as shown in (B) and then to a level (P3) where two masks are formed.

FIG. 12 is a graph illustrating the signal resolution SR, the error rate ER, signal amplitude SA and the cross talk CT relative to the readout power of a super resolution disk of the double mask system. As seen from FIG. 12, only the first masked area MS1 is formed when the readout power remains low and the signal resolution SR falls as the readout power rises as in the case of the RAD system. However, as the readout power rises further to give rise to the second masked area MS2, the signal resolution SR rises with the readout power as in the case of the FAD system. On the other hand, the error rate ER falls as the readout power rises from a low level and keeps on falling while the readout power goes up above the P2 level. However, the error rate ER reaches the lowest point when the readout power gets to a certain level. Two masks already exists at this point. Thereafter, the error rate ER rises as the readout power increases. The signal resolution corresponding to the readout power level that minimizes the error rate ER takes the above described reference value K that provides the target value for controlling the readout power.

While the super resolution recording medium is discussed above mainly in terms of opto-magnetic disk, the above description applies not only to MSR (magnetic super resolution) disks but also to phase change super resolution (PSR) disks and a ROM super resolution (RSR) disks. It also applies to recording media other than disks.

Figure 13:
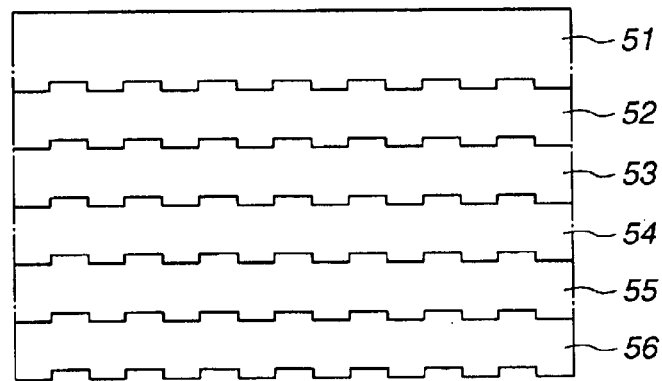
FIG. 13 is a schematic illustration of the structure of a ROM super resolution disk.

FIG. 13 is a schematic illustration of the structure of a ROM super resolution (RSR) disk. The disk of FIG. 13 comprises a substrate 51, a protection layer 52, a $Ge_2Sb_2Te_5$ layer 53, another protection layer 54, a reflection layer 55 and still another protection layer 56 arranged in the above mentioned order. It becomes adapted to super resolution readout as a high temperature area is masked as in the case of the FAD system. When a laser beam is irradiated onto a chalcogenide film such as the $Ge_2Sb_2Te_5$ layer 53 to form a light spot there, an area of the light spot heated by the light beam becomes molten to change its refractive index and start operating as mask that absorb light. The area in the light spot other than the mask of the $Ge_2Sb_2Te_5$ layer 53 forms a detection window (aperture) so that the information recorded in the reflection layer 55 can be read out through the detection window. In the case of a phase change super resolution (PSR) disk, while the reflection layer 55 is replaced by a recording layer, otherwise it is structurally identical with a ROM disk shown in FIG. 13. Also, the signal resolution, the error rate, the signal amplitude and the cross talk relative to the readout power of a ROM disk or a PSR disk are same as those shown in FIG. 8 and hence will not be discussed here any further.

As described above, the signal amplitude, the cross talk and the spatial frequency changes as the size and position of the aperture and those of the mask are changed by the readout power so that consequently, the optimal area for data detection will be quite limited.

Figure 14A:
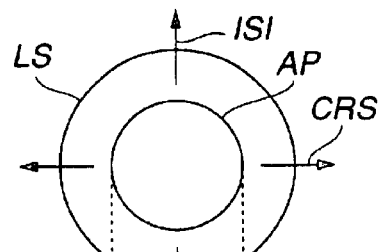
FIGS. 14(A) and 14(B) are schematic illustrations of the parameters that affect the detection window (aperture).
Figure 14B:
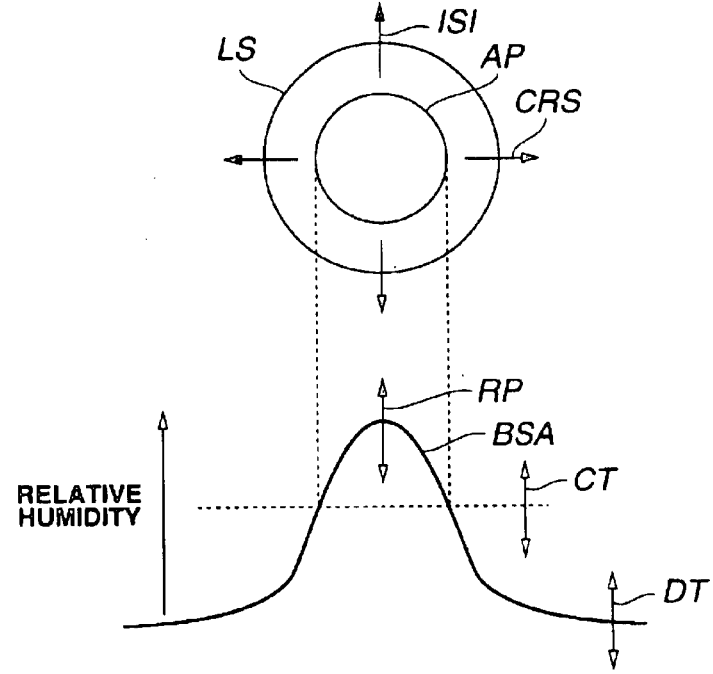

FIG. 14 is a schematic illustration of the parameters that affect the detection window (aperture). In FIG. 14, (A) shows a schematic plan view of light spot LS on a recording medium formed by irradiating a light beam and its vicinity and (B) shows the temperature curve of the area shown in (A). As seen from FIG. 14, the temperature curve moves in the directions indicated by the arrows to change the aperture AP as the readout power RP changes. However, it should be noted that the aperture AP is changed not only by the change in the readout power RP but also by the change in the transfer temperature CT at which the data is transferred from the recording layer to the readout layer, said transfer temperature CT representing the sensitivity of the recording medium, and the change in the temperature of the recording medium DT. The aperture AP is also changed by the strain of the light beam BSR caused by the effect of tilting or defocussing. These parameters can be optimized by detecting the factor such as the resolution that can optimize the frequency of the signal that is most related to the aperture size and optimizing the detected factor. This process of optimization can be applied not only to opto-magnetic disks but also to super resolution disks of any type.

Controlling the resolution so as to make it optimized when detecting data refers to optimization of the aperture. More specifically, the resolution that minimizes the jitter or the error rate at the time of data detection is determined and selected as reference value or target value for controlling the readout power so as to optimize the aperture.

According to the above cited Japanese Patent Application Laid-Open No. 8-63817, the levels of the signals respectively representing so many recording marks that have different lengths are detected and compared with each other and the readout power is so controlled as to make the outcome of the comparison become close to a predetermined reference value in order to carrying out the readout operation always in the best condition. Referring to FIGS. 15A and 15B, for instance, if the unit time of the channel bit of a signal (the clock period of the channel bit) is T, the amplitude X of the read out signal of the data having a mark length of 2T as shown in FIG. 15A and the amplitude Y of the read out signal of the data having a mark length of 4T as shown in FIG. 15B are detected and the ratio of the amplitudes, or X/Y, is determined. Then, the readout power is so controlled as to make the ratio of the amplitudes X/Y become close to a predetermined reference value. The signal $S_{2ST}$ of the mark having a mark length of 2T shown in FIG. 15A is a signal obtained by reproducing a data showing a pattern of alternately arranged "00s" and "11 s" in the NRZ format, whereas the signal $S_4ST$ of the mark having a mark length of 4T shown in FIG. 15B is a signal obtained by reproducing a data showing a pattern of alternately arranged "0000s" and "111s".

With the technique of detecting signals having different mark lengths, the read out signal may show a peak value at a position different from the clock position for data detection depending on the modulation system and the demodulation system. If the peak has to be detected for such a signal, an additional signal processing procedure requiring the use of a clock different from the clock for data detection will have to be followed. Then, the hardware adapted to such a procedure will inevitably have a complex configuration and/or the load of following the signal processing procedures will be considerable. Additionally, there may be patterns that do not appear in the data to be read out. For example, in the case of the 2-7 NRZ modulation system, where the patterns that do not appear in the data are those of the mark lengths to be detected such as 2T and 4T as described above, it is necessary to provide a specific area for storing the patterns that do not appear in the data to be read. Then, the redundancy relative to the data will inevitably increase. Still additionally, it will be necessary to provide specific areas for storing cyclic patterns such as 2T and 4T on the disk in a distributed fashion. Then, problems can arise when defects are intensively found in such areas.

In view of these circumstances, according to the invention, the resolution is detected on the level of the signal to be read out. More specifically, two techniques may be used for detecting the resolution. With the first technique, the difference X between sampled value Y close to the peak value and the sampled value of the adjacent sampling point is determined for the read out waveform of an isolated mark in the recorded data of, for instance, the 2-7 NRZ modulation system that is separated from any other marks and the ratio X/Y is used as resolution. The second technique, on the other hand, utilizes the asymmetry of the recorded mark and the ratio of the average level (center level) X to the saturation level Y of the read out signal, or X/Y, is used as resolution.

With either of the above two techniques, the resolution that optimizes the detection window (aperture) is used as reference value (or target value) K and the power (the readout power) of the laser emitting elements is so controlled as to make the resolution (the ratio of the amplitudes X/Y) become close to the reference value K.

It may be so arranged that the reference value K of resolution that corresponds to the situation where the detection window is optimized can be obtained by reading out the information written on a predetermined area (e.g., a control track) of the optical disk for the reference value K. Alternatively, it may be so arranged that a test readout operation is conducted on a predetermined test recording area (e.g., a fest track), while changing the readout power, at the loading time of the optical disk or at appropriate regular time intervals to determine the jitter or the error rate and also the point that minimizes the jitter or the error rate on the basis of the read out data so that the ratio X/Y may be obtained as reference value K. Still alternatively, it may be so arranged that a test readout operation is conducted, while changing the readout power, and the dispersion of the signal level near each peak of signal level distribution is determined so that the ratio X/Y that is obtained when the sum of the dispersions is minimized may be used as reference value K.

Now, the first and second embodiments of the present invention to which the above first and second techniques are applied respectively will be described below by referring to the related accompanying drawings.

FIG. 16 is a schematic illustration of the theory underlying the first embodiment of information readout apparatus according to the invention to which the above first technique is applied. In FIG. 16, (A) shows the waveform of the recorded data of an isolated mark and its vicinity, where isolated pulse $P_0$ having a width of 2T representing the shortest interval for inversion is observable. In FIG. 16, (B) shows the isolated mark $M_0$ that can be obtained by recording the data of (A) on a recording track of the optical disk. In FIG. 16, (C) shows three different readout waveforms Sa, Sb and Sc that can be obtained by reading out the isolated mark $M_0$ with different levels of readout power. Assuming that the sampled value (wave height value) at sampling point to located at the center of the isolated mark $M_0$ is Y and the difference between the sampled value Y and the sampled value at either of the adjacent sampling points $t_-$ and $t_+$ is X, the ratio X/Y is detected as the value representing the resolution. Then, the resolution X/Y with optimal readout power is selected as target value (reference value) K in advance and the readout power is so servo-controlled as to make the ratio X/Y detected at each sampling point become close to the target value K.

In the case of a super resolution disk of the RAD system, the greater the readout power, the larger the aperture AP as pointed out earlier. Then, the readout waveform will change from Sc for small readout power to Sb and then to Sa as shown in (C) of FIG. 16 as the readout power increases. Then, the resolution X/Y will be highest for the readout waveform Sc and decreases as the waveform changes to Sb and then to Sa. In other words, the relationship between the readout power and the resolution X/Y can be expressed by curve $SR_R$ in FIG. 17 that declines as the readout power rises.

In the case of a super resolution disk of the FAD system, on the other hand, the greater the readout power, the smaller the aperture AP also as pointed out earlier. Then, the relationship between the readout power and the resolution X/Y can be expressed by curve SRF in FIG. 17 that rises as the readout power rises.

Figure 18:
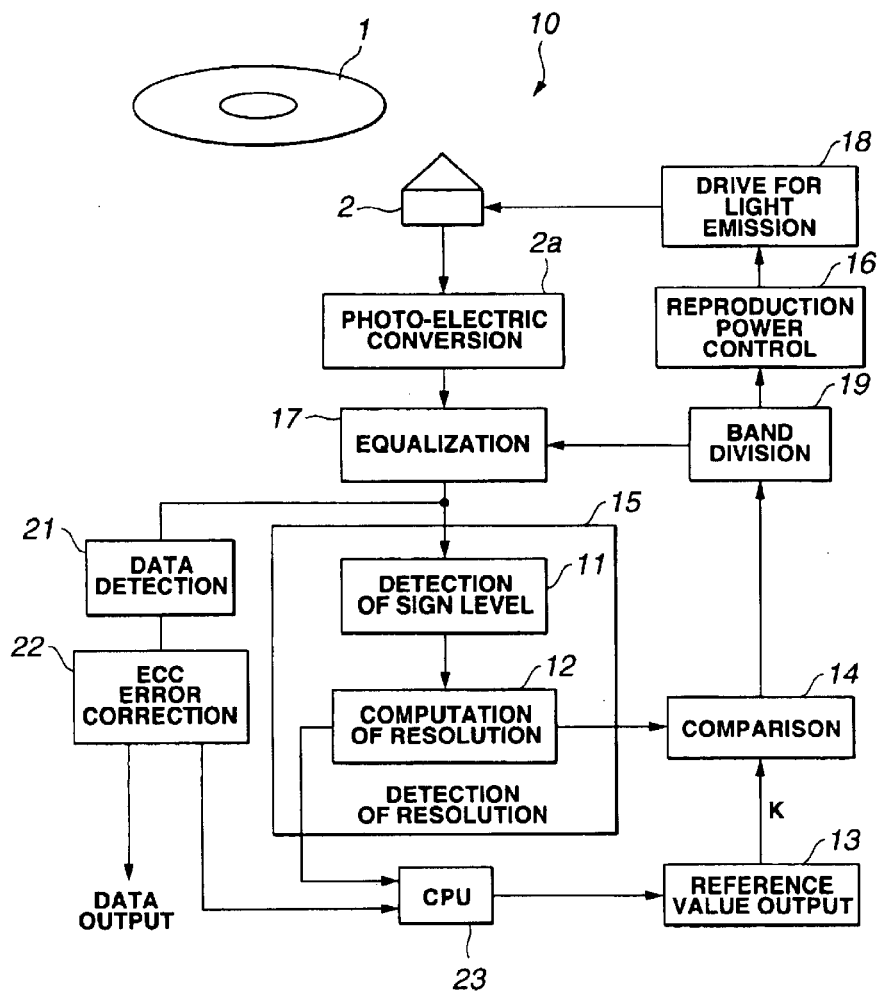
FIG. 18 is a schematic block diagram of an optical disk apparatus to which the first embodiment is applied.
Figure 19:
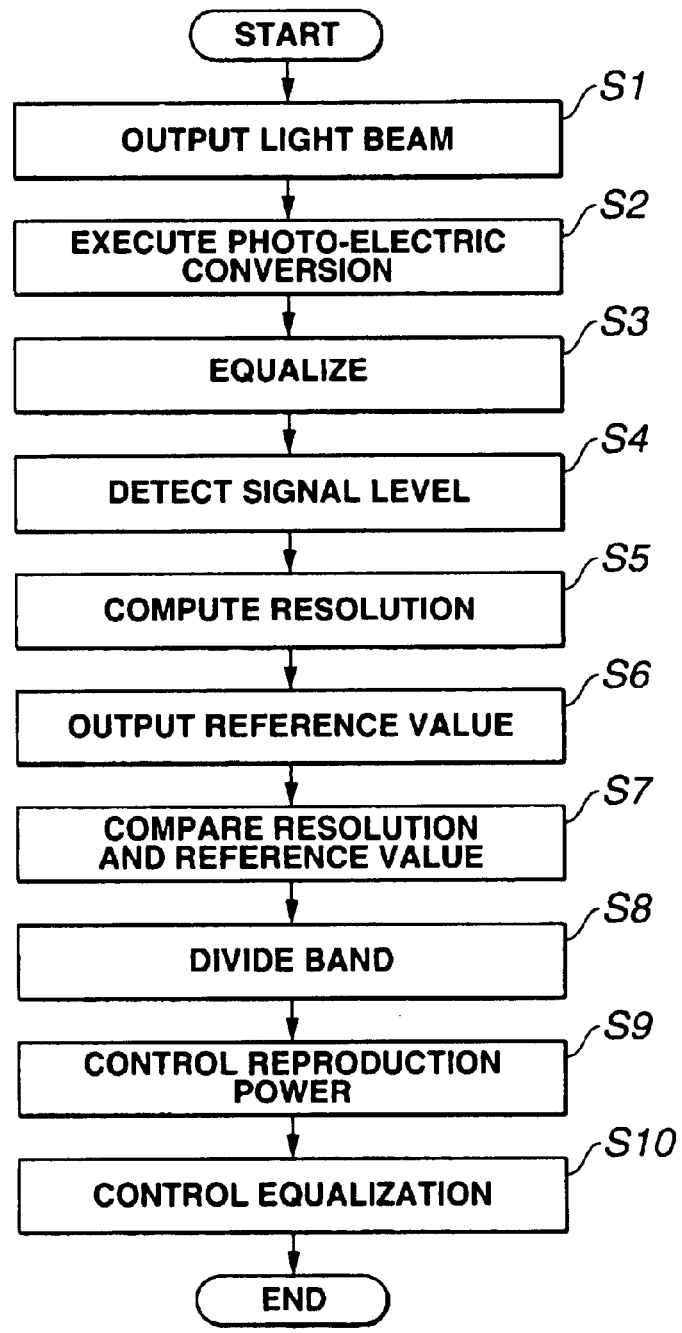
FIG. 19 is a flow chart of the operation of the first embodiment.

FIG. 18 is a schematic block diagram of an optical disk apparatus to which the first embodiment is applied. FIG. 19 is a flow chart of the operation of the optical disk apparatus of FIG. 18.

A super resolution optical disk 1 is used as optical disk in the optical disk apparatus 10 of FIG. 18. Referring to FIG. 19, a light beam (laser beam) is emitted from head 2 onto the optical disk 1 in Step S1 and the reflected light beam from the optical disk 1 is detected by photoelectric converter (photodetector) 2a, which produces a readout signal out of the light beam (photoelectric conversion of Step S2 in FIG. 19) and sends it to equalizing circuit (equalizer) 17. Then, in Step S3, the equalizing circuit 17 equalizes (the waveform) of the readout signal. The equalizing circuit 17 may typically use a cosine equalizer so that its equalizing characteristics (e.g., equalizing gain) can be controlled. The readout signal output from the equalizing circuit 17 is sent to signal level detecting circuit 111 of the resolution detecting section 15 and also to data detecting circuit 21, which will be described hereinafter.

In the resolution detecting section 15, the signal level detecting circuit 11 detects the signal level by way of sampling (Step S4) and the resolution computing circuit 12 computationally determines the resolution (Step S5). The signal representing the obtained resolution is sent to comparator circuit 14, which is also fed with reference value K output from reference value output circuit 13 (Step S6).

The comparator circuit 14 then compares the resolution obtained from the resolution computing circuit 12 of the resolution detecting section 15 and the reference value K obtained from the reference value output circuit 13 (Step S7) and the signal representing the outcome of the comparison, or the difference between the resolution and the reference value K, is sent to band dividing circuit 19. The band dividing circuit 19 divides the signal representing the resolution, or the difference between the resolution and the reference value K to be more accurate, into a DC component, a low frequency component and a high frequency component (Step S8), of which the DC component and the low frequency component are sent to readout power control circuit 16 and used for controlling the readout power (Step S9), while the high frequency component is sent to the equalizing circuit 17 and used to control the equalizing operation (Step S10). In this instance, the low range factor (the DC component and the low frequency component) including the ambient temperature of the recording medium that changes only little with time is used to control the readout power while the high range factor is used to control the equalizing performance including the equalization gain.

It will be needless to say that the above described arrangement of dividing the signal representing the resolution (the difference between the resolution and the reference value K to be more accurate) into a DC component, a low frequency component and a high frequency component and using the DC component and the low frequency component for controlling the readout power, while using the high frequency component for controlling the equalizing operation can be applied to the above described first embodiment.

The readout signal from the equalizing circuit 17 is sent to data detection circuit 21, which is typically adapted to detect (read out) data by detecting partial responses PR (1, 2, 1). More specifically, in the case of the detection of PR (1, 2, 1) of a 1-7 NRZI modulation signal, the signal level is made to be quaternary and a binary data is read out typically by means of Viterbi decoding (maximum likelihood decoding). The read out data from the data detection circuit 21 is sent to ECC (error correction code) error correcting circuit 22 for the purpose of error correction and then taken out as output data. Additionally, the bit error information from the ECC error correcting circuit 22 is sent to CPU 23 for the purpose of selecting reference value K and the resolution from the resolution computing section 12 obtained when the bit error rate is minimal is selected as reference value K, which reference value K is then output from the reference value output circuit 13 and sent to the comparator circuit 14.

As described above, with the first embodiment of the invention, the resolution can be detected by using only the readout signal of the isolated mark prepared and recorded on the recording medium in advance so that, unlike the prior art, it is no longer necessary to provide a plurality of recording mark patterns having respective lengths that are different from each other so that the level of redundancy and the reduction of the recording capacity of the disk can be minimized. Nor is it necessary to use a clock dedicated to detect the amplitude of the read out signal having a specific mark length.

Now, the second embodiment of the invention will be described below. This embodiment is adapted to detect the resolution on the basis of the ratio of the average level (center level) X to the saturation level Y of the readout signal.

FIG. 20 is a schematic illustration of the theory underlying the second embodiment of the invention, which is applied to an optical disk readout apparatus. In FIG. 20, (A) shows a recorded mark RM recorded on a recording track TR and, when a light beam is irradiated on the recorded mark RM with two different readout power levels, two apertures $AP_1$ and $AP_2$ are formed with respective sizes that are different from each other. In FIG. 20, (B) shows three different readout waveforms Sa, Sb and Sc obtained as a result of reading out the recorded mark RM as shown in (A) of FIG. 20 and corresponding to three different levels of readout power. Of each of the waveforms shown in (B) of FIG. 20, the saturated value of the readout signal level (saturation level) is expressed by Y and the ratio of the center level (average level) of the readout signal to the saturation level, or X/Y, is detected as value corresponding to the resolution. The resolution X/Y for an optimal readout power level is selected in advance as target value (reference value) K and the readout position is so serve-controlled as to make the ratio X/Y as detected during the readout operation become close to the target value K.

In the case of a super resolution disk of the RAD system, the greater the readout power, the larger the aperture AP as pointed out earlier. Then, the readout waveform will change from Sc for small readout power to Sb and then to Sa as shown in (B) of FIG. 20 as the readout power increases. Then, the resolution X/Y will be highest for the readout waveform Sc and decreases as the waveform changes to Sb and then to Sa. In other words, the relationship between the readout power and the resolution X/Y can be expressed by curve $SR_R$ in FIG. 21 that declines as the readout power rises.

In the case of a super resolution disk of the FAD system, on the other hand, the greater the readout power, the smaller the aperture AP also as pointed out earlier. Then, the relationship between the readout power and the resolution X/Y can be expressed by curve $SR_F$ in FIG. 21 that rises as the readout power rises.

The optical disk readout apparatus to which the second embodiment of the invention is applied may have a configuration same as the one illustrated in FIG. 18. Then, referring to FIG. 18, the signal level detection circuit 11 of the resolution detecting section 15 may be used to detect the saturation level and the average level of the readout signal, while the resolution computing circuit 12 may be used to computationally determines the resolution on the basis of the level ratio of X/Y.

Thus, with the above described second embodiment, it is no longer necessary to record in advance a signal representing a specific mark length on the optical disk and the resolution can be detected on the basis of the saturation level and the average level of the signal read out for an ordinary data so that, unlike the prior art, it is no longer necessary to record in advance signals having specific respective mark lengths on the optical disk so that the level of redundancy and the reduction of the recording capacity of the disk can be minimized because the resolution can be detected on the basis of the average level and the saturation levels of the signals of the ordinary signals read out from the recording medium. Nor is it necessary to use a clock dedicated to detect the amplitude of the read out signal having a specific mark length and accurately obtain resolution-related information on a stable basis. Furthermore, the aperture is corrected by dividing the frequency and combining the control of the readout power and the control of the equalizing operation so that the accuracy and the stability can be further improved.

It should be noted that the present invention is by no means limited to the above embodiments. For example, recording media to which the present invention is applicable is not limited to magnetic super resolution disks and includes phase change super resolution disks and ROM super resolution disks as well as recording media other than disks.

What is claimed is:

1. An information readout apparatus for irradiating a recording medium having a recording layer and a readout layer with a light beam and reading recorded information of the recording layer by opening a detecting window smaller in size than an area irradiated with the light beam, said apparatus comprising:

a resolution detecting means for detecting a resolution based upon sampled values of a readout waveform of an isolated mark recorded/formed on said recording medium, said resolution detecting means detects the resolution based upon a quotient obtained by dividing a difference X between a sample value Y near a peak of said isolated mark and a sample value adjacent to said sample value Y by said sample value Y near the peak, or X/Y;

a reference value output means for outputting a reference value for said resolution; and, a readout control means for controlling the size of said detection window so as to make said detected resolution close to said reference value.

2. An information readout apparatus according to claim 1, wherein said readout control means controls readout power of the light beam irradiating said recording medium.

3. An information readout apparatus according to claim 1, wherein said reference value output means outputs the value of X/Y that minimizes jitter or error rate at a time of detecting data of said readout signal as a reference value.

4. An information readout apparatus according to claim 1, wherein the reference value is provided in said reference value output means either at the time of loading said recording medium or periodically.

5. An information readout apparatus for irradiating a recording medium having a recording layer and a readout layer with a light beam and reading recorded information of the recording layer by opening a detecting window smaller in size than an area irradiated with the light beam, said apparatus comprising:

a first resolution detecting means for detecting resolution based upon average level and saturation level of signals readout from said recording medium, said first resolution detecting means detects the resolution on the basis of a ratio of a saturation level Y of said readout signal and an average level X of the readout signal, or X/Y;

a second resolution detecting means for detecting the resolution based upon a signal level of the readout waveform of an isolated mark recorded/formed on said recording medium;

a reference value output means for outputting a reference value for said resolution; and, a readout control means for controlling the size of said detection window to make said detected resolution close to said reference value.

6. An information readout apparatus according to claim 5, wherein said readout control means controls readout power of the light beam irradiating said recording medium.

7. An information readout apparatus according to claim 5, wherein said reference value output means outputs the value of X/Y that minimizes jitter or error rate at a time of detecting data of said readout signal as a reference value.

8. An information readout apparatus according to claim 5, wherein

The reference value is provided in said reference value output means either at the time of loading said recording medium or periodically.

9. An information readout method for irradiating a recording medium having a recording layer and a readout layer with a light beam and reading recorded information of the recording layer by opening a detecting window smaller in size than the area irradiated with the light beam, said method comprising steps of:

detecting a resolution based upon the sampled values of a readout waveform of an isolated mark recorded/formed on said recording medium, the resolution is detected in said resolution detecting step based upon a quotient obtained by dividing a difference X between a sample value Y near a peak of said isolated mark and a sample value adjacent to said sample value Y by said sample value Y near the peak, or X/Y;

outputting a reference value for said resolution; and, controlling the size of said detecting window to make said detected resolution close to said reference value.

10. An information readout method for irradiating a recording medium having a recording layer and a readout layer with a light beam and reading recorded information of the recording layer by opening a detecting window smaller in size than an area irradiated with the light beam, said method comprising steps of:

detecting a first resolution based upon an average level and saturation level of signals read out from said recording medium, said first resolution detecting means detects the resolution on the basis of a ratio of a saturation level Y of said readout signal and an average level X of the readout signal, or X/Y;

detecting a second resolution based upon a signal level of a read out waveform of an isolated mark recorded/formed on said recording medium;

outputting a reference value for said resolution; and controlling the size of said detection window to make said detected resolution close to said reference value.

11. An information readout apparatus for irradiating a recording medium having a recording layer and a readout layer with a light beam and reading recorded information of the recording layer by opening a detecting window smaller in size than an area irradiated with the light beam, said apparatus comprising:

a resolution detector configured to detect a resolution based upon sampled values of a readout waveform of an isolated mark recorded/formed on said recording medium, said resolution detector detecting the resolution based upon a quotient obtained by dividing a difference X between a sample value Y near a peak of said isolated mark and a sample value adjacent to said sample value Y by said sample value Y near the peak, or X/Y;

a reference value output circuit configured to output a reference value for said resolution; and, a readout controller configured to control the size of said detection window so as to make said detected resolution close to said reference value.

12. An information readout apparatus for irradiating a recording medium having a recording layer and a readout layer with a light beam and reading recorded information of the recording layer by opening a detecting window smaller in size than an area irradiated with the light beam, said apparatus comprising:

a first resolution detector configured to detect resolution based upon average level and saturation level of signals readout from said recording medium, said first resolution detector detecting the resolution on the basis of a ratio of a saturation level Y of said readout signal and an average level X of the readout signal, or X/Y;

a second resolution detector configured to detect the resolution based upon a signal level of the readout waveform of an isolated mark recorded/formed on said recording medium;

a reference value circuit configured to output a reference value for said resolution; and, a readout controller configured to manage the size of said detection window to make said detected resolution close to said reference value.

* * * * *

UNITED STATES PATENT AND TRADEMARK OFFICE
CERTIFICATE OF CORRECTION

PATENT NO.     : 6,845,074 B1
DATED          : January 18, 2005
INVENTOR(S)    : Goro Fujita It is certified that error appears in the above-identified patent and that said Letters Patent is hereby corrected as shown below:

Column 4,
Line 29, change "nark" to -- mark --.

Column 11,
Line 59, change "to" to -- $t_0$ --.

Column 12,
Line 35, change "111" to -- 11 --.

Signed and Sealed this

Thirty-first Day of May, 2005

JON W. DUDAS
*Director of the United States Patent and Trademark Office*